US008797995B2

(12) United States Patent
Stammers et al.

(10) Patent No.: US 8,797,995 B2
(45) Date of Patent: Aug. 5, 2014

(54) DEVICE-ASSISTED LAYER 3 HANDOFF FOR MOBILE SERVICES

(75) Inventors: Timothy Stammers, Raleigh, NC (US); Varsha Clare, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1317 days.

(21) Appl. No.: 11/654,816

(22) Filed: Jan. 18, 2007

(65) Prior Publication Data

US 2008/0175200 A1 Jul. 24, 2008

(51) Int. Cl.
*H04W 4/00* (2009.01)
*H04W 36/00* (2009.01)

(52) U.S. Cl.
USPC .......................................... 370/331; 455/437

(58) Field of Classification Search
USPC ................... 370/328–338; 455/432, 435, 436, 455/432.1–446, 437
See application file for complete search history.

(56) References Cited

U.S. PATENT DOCUMENTS

| 5,949,771 | A | 9/1999 | DeClerck et al. | |
|---|---|---|---|---|
| 6,301,479 | B1 * | 10/2001 | Roobol et al. | 455/436 |
| 7,046,647 | B2 | 5/2006 | Oba et al. | |
| 7,099,283 | B2 | 8/2006 | Matta et al. | |
| 7,151,758 | B2 | 12/2006 | Kumaki et al. | |
| 2004/0180660 | A1 * | 9/2004 | Choi et al. | 455/436 |
| 2004/0218573 | A1 * | 11/2004 | Takahashi et al. | 370/338 |
| 2004/0246972 | A1 | 12/2004 | Wang et al. | |
| 2005/0083885 | A1 * | 4/2005 | Ikeda et al. | 370/331 |
| 2006/0092878 | A1 | 5/2006 | Shirota et al. | |
| 2006/0245394 | A1 | 11/2006 | Baba et al. | |
| 2006/0245404 | A1 * | 11/2006 | Bajic | 370/338 |
| 2006/0291425 | A1 * | 12/2006 | Park et al. | 370/331 |
| 2007/0036109 | A1 | 2/2007 | Kwak et al. | |
| 2007/0041346 | A1 * | 2/2007 | Bae et al. | 370/331 |
| 2007/0258427 | A1 * | 11/2007 | Shaheen et al. | 370/338 |
| 2008/0137615 | A1 | 6/2008 | Park et al. | |
| 2008/0286300 | A1 | 7/2008 | Stammers et al. | |
| 2009/0052398 | A1 | 2/2009 | Hofmann | |
| 2010/0098021 | A1 | 4/2010 | Stammers et al. | |

OTHER PUBLICATIONS

USPTO Jul. 1, 2011 Non-Final Office Action from U.S. Appl. No. 12/252,570.
USPTO Oct. 3, 2011 Response to Jul. 1, 2011 Non-Final Office Action from U.S. Appl. No. 12/252,570.
USPTO Oct. 31, 2011 Final Office Action from U.S. Appl. No. 12/252,570.
USPTO Jan. 31, 2012 Request for Continued Examination in Response to Oct. 31, 2011 Final Office Action from U.S. Appl. No. 12/252,570.
USPTO Mar. 5, 2012 Final Office Action from U.S. Appl. No. 12/252,570.

* cited by examiner

*Primary Examiner* — Christopher M Brandt
(74) *Attorney, Agent, or Firm* — Patent Capital Group

(57) ABSTRACT

In one embodiment, an apparatus can include: (i) a layer 3 point of attachment having an input configured to receive handoff indicative information from a mobile device substantially in parallel with the handoff indicative information being received in a layer 2 handoff function; and (ii) logic configured to perform a handoff facilitating action in response to the handoff indicative information.

20 Claims, 5 Drawing Sheets

DEVICE-ASSISTED LAYER 3 HANDOFF FOR MOBILE SERVICES

TECHNICAL FIELD

The present disclosure relates generally to mobile services and, in particular, to device-assisted layer 3 handoffs.

BACKGROUND

Movement of a device between network layer 3 points of attachment can result in a layer 3 "handoff." Layer 3 packets related to a service may then have to be transferred to the device via a new point of attachment. In the case of mobile access networks, delays involved in such a transfer can be significant. Further, such a delay can result in service interruption that may be perceived by an end user, and thus may negatively impact the end user's perception of the overall service quality.

Conventional approaches for "fast handoff" include: (i) layer 2 triggers, as provided in Internet Engineering Task Force (IETF) drafts and associated documents; (ii) anchoring techniques at a previous point of attachment, as also provided in IETF drafts and associated documents; and (iii) a hierarchy of points of attachment in an attempt to minimize an occurrence of a change of network layer 3 points of attachment, as seen in 3rd Generation Partnership Project (3GPP), and 3GPP2, documents. However, these approaches involve a network attempting to provide a new point of attachment choice once the mobile device has determined, and the network has allowed, a new point of layer 2 attachment.

DESCRIPTION OF EXAMPLE EMBODIMENTS

Overview

Figure 1:
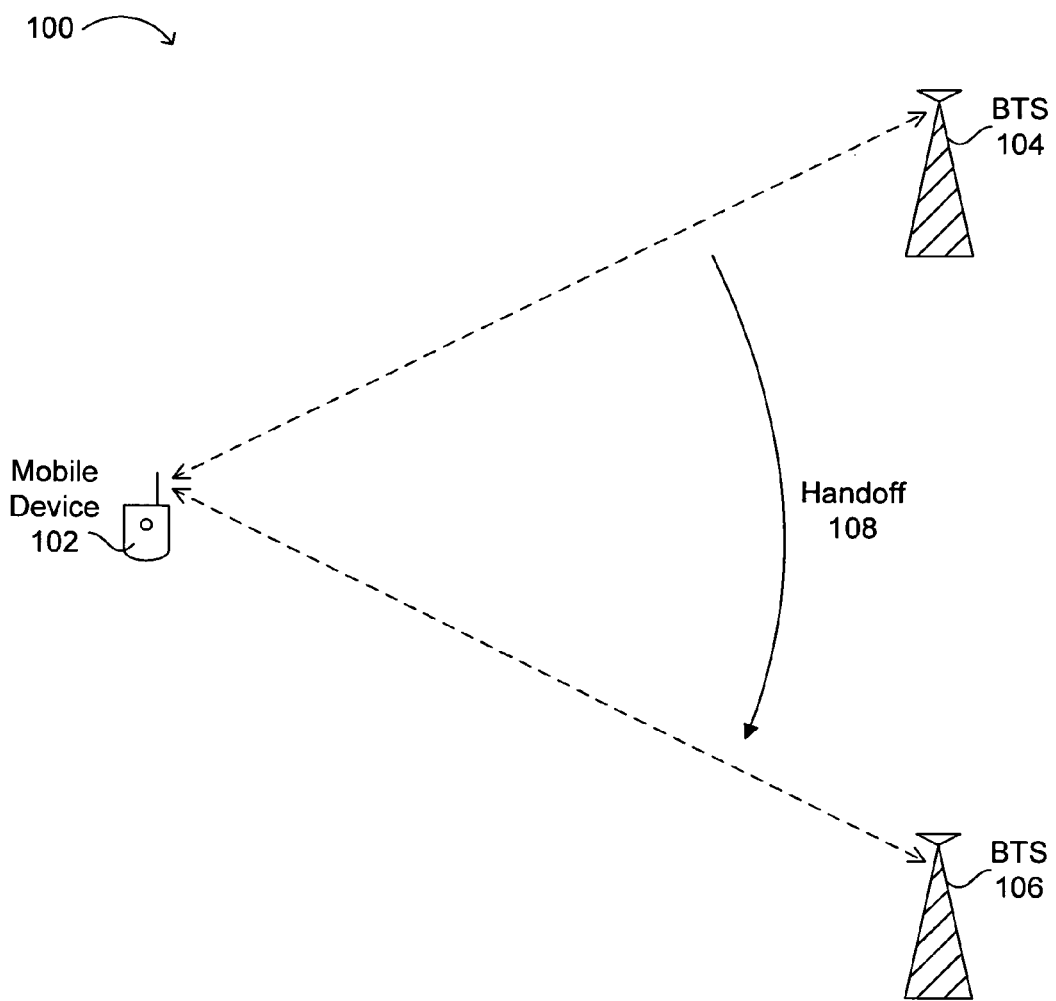
FIG. 1 illustrates an example mobile device handoff.

In one embodiment, an apparatus can include: (i) a layer 3 point of attachment having an input configured to receive handoff indicative information from a mobile device substantially in parallel with the handoff indicative information being received in a layer 2 handoff function block; and (ii) logic configured to perform a handoff facilitating action in response to the handoff indicative information.

In one embodiment, a method can include: (i) receiving a message in a layer 3 point of attachment from a mobile device, the message having handoff indicative information; (ii) sending a request for other available layer 3 points of attachment to a mobility anchor; (iii) receiving a list of suitable layer 3 points of attachment from the mobility anchor; and (iv) arranging one or more paths to facilitate a handoff to a new layer 3 point of attachment in the list.

In one embodiment, an apparatus can be configured to: (i) receive a message in a layer 3 point of attachment from a mobile device, the message having handoff indicative information; (ii) send a request for other available layer 3 points of attachment to a mobility anchor; (iii) receive a list of suitable layer 3 points of attachment from the mobility anchor; and (iv) arrange one or more paths to facilitate a handoff to a new layer 3 point of attachment in the list.

In one embodiment, a system can include: (i) a layer 3 point of attachment having an input configured to receive handoff indicative information about a mobile device, the layer 3 point of attachment having logic configured to perform a handoff facilitating action in response to the handoff indicative information; and (ii) a layer 2 handoff function block coupled to the layer 3 point of attachment, where the layer 2 handoff function block and the layer 3 point of attachment are configured to receive the handoff indicative information substantially in parallel.

Example Embodiments

In cellular telecommunications, "handoff" can refer to a process of transferring an ongoing call or data session from one channel connected to a core network to another such channel. Typically, a handoff may be needed when a cell phone or other mobile device is likely to move out of range from one cell site or base station, and a better radio link can be obtained from a stronger transmitter, or when one base station is approaching capacity limitations such that the connection can be transferred to another nearby base station for load balancing.

A typical form of handoff is that used in GSM (global system for mobile communications) and analog cellular networks, where a phone call in progress may be redirected from one cell site and its transmit/receive frequency pair to another base station (or sector within the same cell) using a different frequency pair, without interrupting the phone call. As the phone can be connected to only one base station at a time and therefore needs to drop the radio link for a brief period of time before being connected to a different, stronger transmitter, this is referred to as a "hard handoff."

In CDMA (code division multiple access) systems, the phone can be connected to several cell sites simultaneously, while combining the signaling from nearby transmitters into one signal using a rake receiver. Each cell can be made up of one to three or more sectors of coverage, produced by a cell site's independent transmitters outputting through antennas pointed in different directions. The set of sectors to which the phone may be currently linked is referred to as the active set. A "soft handoff" can occur when a CDMA phone adds a new and sufficiently-strong sector to its active set. Further, this is typically done by maintaining a radio link with the previous sector(s) until after a new link is established with a new sector.

While particular embodiments described herein primarily involve cell phone voice service examples, embodiments are also suitable to other areas that may need handoff, or handoff like, functions. For example, particular embodiments may be utilized in cellular voice over internet protocol (VoIP), or in any situation where mobile data services may require minimal service interruption on handoff.

Referring now to FIG. 1, an example mobile device handoff is shown and indicated by the general reference character 100. Mobile device (e.g., a cell phone) 102 can be a layer 3 device with an ongoing session or call via base transceiver station (BTS) 104. When mobile device 102 moves to a location close to BTS 106, handoff 108 can occur, as discussed above. Typically, when a cell phone moves from one area to another, a systematic information flow in layers from layer 1, to layer 2, to layer 3, can take place. Thus, one layer at a time may recognize that the cell phone has moved or is preparing to move.

A problem with such approaches is that too much time can pass by the time that the layer 3 point of attachment is aware of the upcoming handoff, so the person on the phone may also notice this delay. In particular embodiments, such handoff indicative information can be passed to layer 2 handoff functions and layer 3 points of attachment not sequentially, but rather in parallel. Accordingly, the system can proceed in a parallel fashion such that a layer 3 point of attachment can know earlier and thus plan for an upcoming handoff.

Any suitable layer 3 mobile device (e.g., a cell phone, a laptop, a personal digital assistant (PDA), etc.) can be utilized in accordance with particular embodiments. Usually, such a mobile device can be aware of an impending change (e.g., the device can detect a reduced signal strength, so the device will know that it has to move to another base station area). Further, information from a cell phone can be sent to a base station controller (BSC) associated with a BTS (e.g., 104, 106), and an associated network itself can decide when a cell phone is to be handed off to another tower or BTS. For layer 2, this network decision can be made in the BSC. In other interface technologies, this network decision can be performed in another structure (e.g., a Radio Network Controller or RNC). For layer 3, a mobility anchor (e.g., a service provider) can be coupled to the point of attachment, so the mobility anchor can provide such a layer 3 network decision.

Particular embodiments can allow a layer 3 device to make determinations of when, and to where, to allow handoff of a mobile device based on knowledge that was conventionally only available to layer 2 devices, or perhaps only available to layer 3 devices in a "messaged" form. By combining direct layer 1 and layer 2 knowledge (e.g., signal strength and history of device movement) with layer 3 topology information, this can allow a layer 3 device to proactively instigate by: (i) triggering layer 3 handoff and providing a rendezvous point for combined layer 2 and layer 3 handoff at a target layer 3 device; and/or (ii) triggering layer 3 handoff and triggering a layer 2 handoff substantially in parallel.

Figure 2:
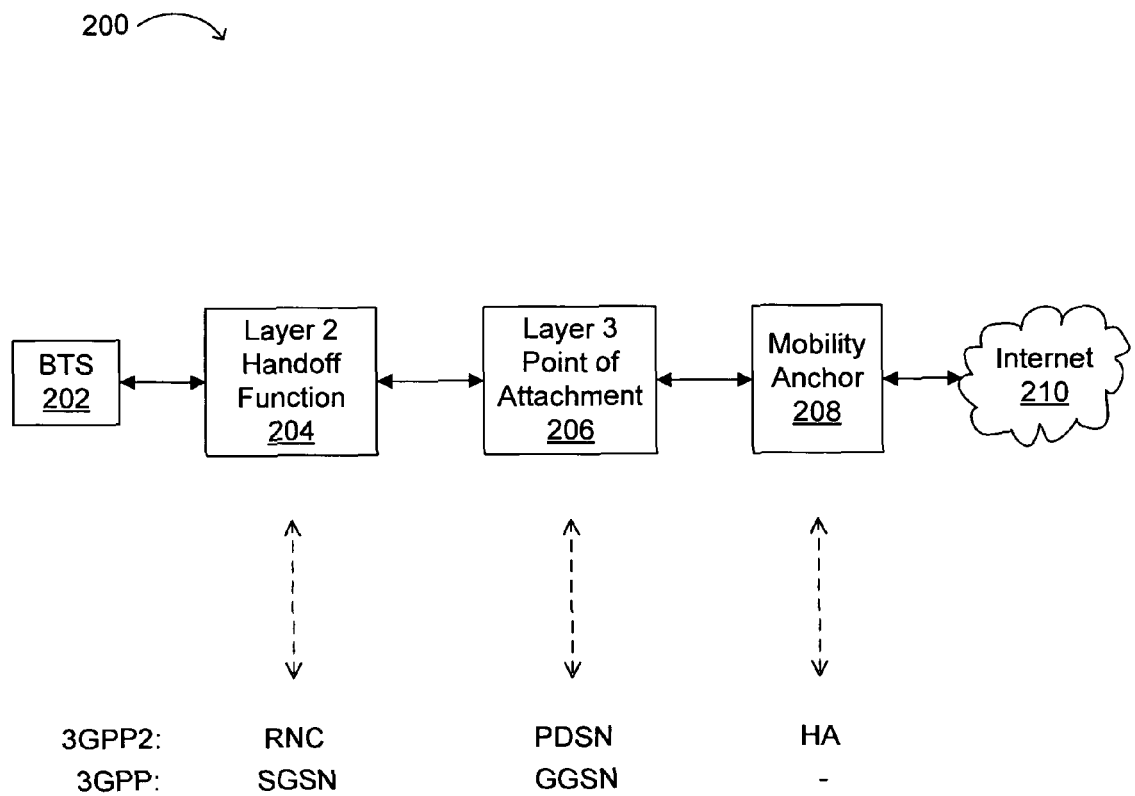
FIG. 2 illustrates example layer 2 and layer 3 handoff components.

Referring now to FIG. 2, example layer 2 and layer 3 handoff components are shown and indicated by the general reference character 200. BTS 202 can interface with layer 2 handoff function 204. Layer 3 point of attachment 206 can interface with layer 2 handoff function block 204, as well as mobility anchor 208. Internet 210, or another network (e.g., a virtual private network (VPN)), can be coupled at mobility anchor 208. For example, layer 2 handoff function block 204 can be a switch and/or router, layer 3 point of attachment 206 can be a router, and mobility anchor 208 can be a service provider.

The functional blocks shown in FIG. 2 can represent different types of nodes and/or gateways for different mobility standards or specifications. For example, in 3GPP (3$^{rd}$ Generation Partnership Project), layer 2 handoff function 204 can be a Serving GPRS (General Packet Radio Service) Support Node (SGSN), and layer 3 point of attachment 206 can be a Gateway GPRS Support Node (GGSN). For 3GPP2, layer 2 handoff function 204 can be RNC, layer 3 point of attachment 206 can be PDSN (Packet Data Serving Node), and mobility anchor 208 can be a home agent (HA). While not shown in FIG. 2, for WiMAX (Worldwide Interoperability for Microwave Access), a layer 2 handoff function can be performed at BTS, a layer 3 point of attachment can be ASNGW (Access Server Gateway), and a mobility anchor can be a home agent.

Using any such mobility standard in particular embodiments, at substantially the same time that a mobile device notifies layer 2 handoff function 204 of handoff indicative information, the information may also be sent to layer 3 point of attachment 206. Thus, a layer 3 point of attachment having notice that it will no longer handle a certain session or call may get out of the loop, or take other appropriate action, relatively quickly. In this fashion, a layer 3 point of attachment may be equipped to avoid any noticeable delays that may be seen by a user subject to a handoff.

Figure 3:
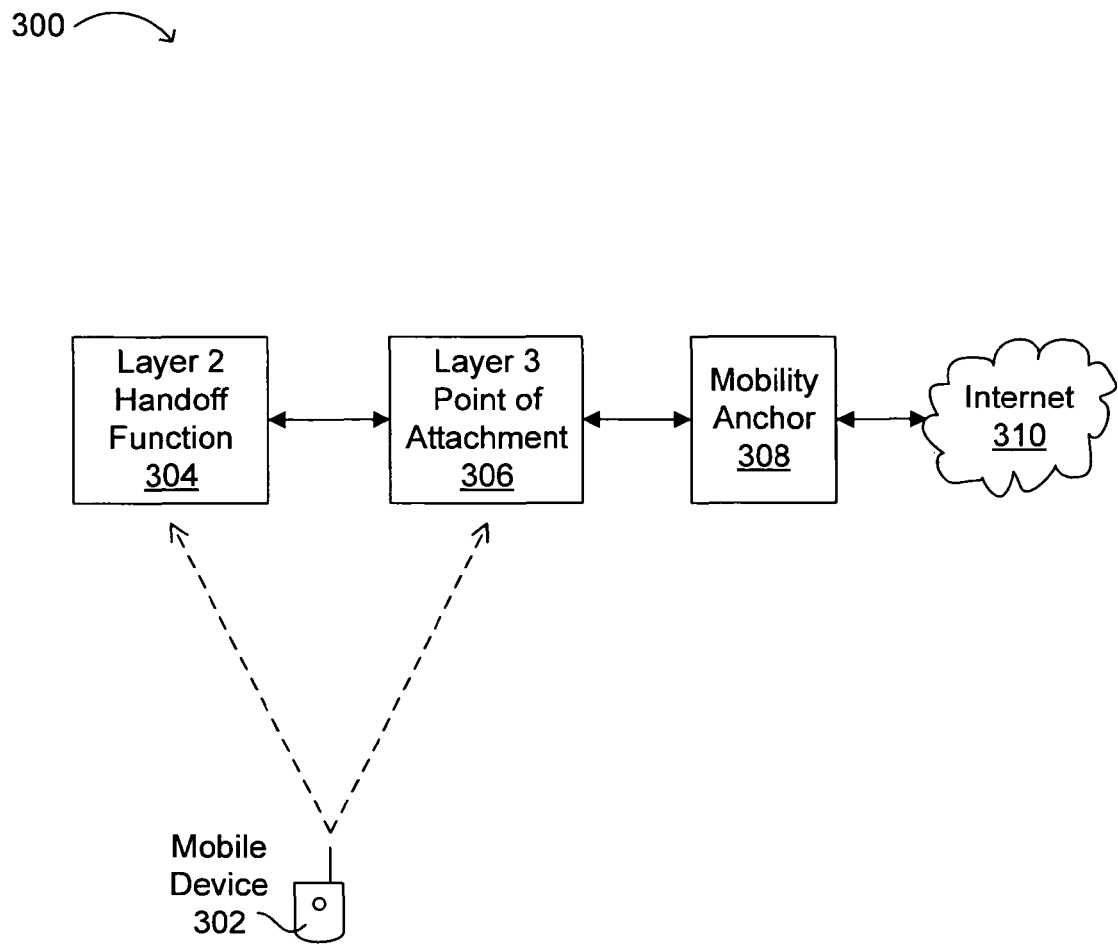
FIG. 3 illustrates an example parallel information path for a layer 2 handoff function and a layer 3 point of attachment.

Referring now to FIG. 3, an example parallel information path for a layer 2 handoff function and a layer 3 point of attachment is shown and indicated by the general reference character 300. In particular embodiments, mobile device (e.g., cell phone) 302, or any other suitable mobile device, can supply handoff indicative information to both layer 2 handoff function 304, as well as to layer 3 point of attachment 306, substantially in parallel. Mobility anchor 308 can also interface with layer 3 point of attachment 306, and to Internet 310, for example.

Examples of handoff indicative information that layer 3 point of attachment 306 may receive from mobile device 302 can include: (i) a cell site identifier via a layer 3 path, such as where the mobile device knows which cell sites are connected to which layer 3 path or point of attachment, can tell which new BTS the mobile device is most likely to move to, then the layer 3 point of attachment may facilitate or set up an appropriate path while layer 2 handoff function 304 may be making a final decision of actually moving the call from one cell site to another; (ii) global positioning system (GPS) information; (iii) cell signal strength received; and/or (iv) any other suitable information or usage intelligence available to the mobile device.

Further, the facilitating of a new connection can include a pre-establishing of radio service (e.g., quality of service (QoS)) when the layer 3 point of attachment determines to which cell site the call will be moving. Thus, in particular embodiments, when such handoff indicative information is available to a layer 3 point of attachment, the layer 3 point of attachment can make intelligent decisions on which services may continue to be provided if the mobile device were to move to a particular cell site, or otherwise may improve the services offered. Accordingly, information typically in layer 2 handoff function 304, as well as any other suitable information, can also be brought into layer 3 point of attachment 306.

Accordingly, in particular embodiments, mobile access network information below layer 3 (e.g., layers 1 and 2) can be made available to layer 3 network elements that are determining the layer 3 point of attachment. Further, this can be done in a "non-filtered" manner such that layer 3 devices (e.g., mobile device 302) can distribute layer 3 related context and user traffic to a set of target layer 3 points of attachment. Thus, information used may be simultaneously available to both the mobile access network, and also to the layer 3 devices via direct mobile device to layer 3 network element signaling.

Particular embodiments can allow for a dynamic determination of a potential set of layer 3 points of attachment to be independent of any mobile access network algorithms. Thus, transfer of service-related packets and context with an imperceptible disruption in service to an end user can be accommodated. Accordingly, particular embodiments can allow and separate the dynamic determination of the potential set of layer 3 points of attachment from the layer 2 algorithms used to determine the set of radio link points of attachment. This can result in an ability to maintain layer 3 service continuity having imperceptible user service interruptions.

Accordingly, particular embodiments can provide a solution that essentially decouples the layer 2 and layer 3 methods for determining the set of radio network and layer 3 points of attachment, respectively. Further, device signaling of relevant information to the layer 3 network elements can be used such that this approach is applicable across multiple radio access technologies.

Also in particular embodiments, cross-technology or inter-technology handoffs can be accommodated where a layer 3 device that is a first hop router for two different access technologies can control when and how layer 3 handoff is performed, perhaps together with pre-establishment of security associations. For example, a call's connection may be transferred from one access technology to another, such as a call being transferred from GSM to W-CDMA (wideband code division multiple access). In particular embodiments, radio specific or terminal provided information directly to a layer 3 point of attachment, rather than being filtered through a layer 2 handoff function may be important in voice where delay is not acceptable, but can also be important in data or other applications as well.

In particular embodiments, a layer 3 device (e.g., mobile device 302) can receive indications of the active and neighbor set of antennas of which the device is aware. By maintaining knowledge of the connectivity of antennas with layer 3 devices, context can be transferred to another layer 3 device in anticipation of handoff. As another example, a layer 3 device can indicate signal strength, or some hysteresis-protected equivalent, for multiple access networks to the layer 3 device, and proactively establish context in another layer 3 device. Such indications can be used to further notify a source of a stream that a duplicate stream should be prepared in anticipation of handoff.

Particular embodiments can be adopted in various mobile wireless NGN (next generation networking) architectures to promote the decoupling of layer 2 and layer 3 functionality. Further, particular embodiments can enable radio independent mobility management by laying groundwork for an IP-based mobility scheme by essentially combining aspects of radio layer 2 and IP layer 3 approaches. For example, mobile wireless devices and mobile wireless infrastructure vendors can support "IP mobility" for wireless networks. Also, particular embodiments can be adapted to provide information, unrelated to the handoff case, that a device knows, directly to network elements other than a next point in the path (e.g., a radio access network element).

Figure 4:
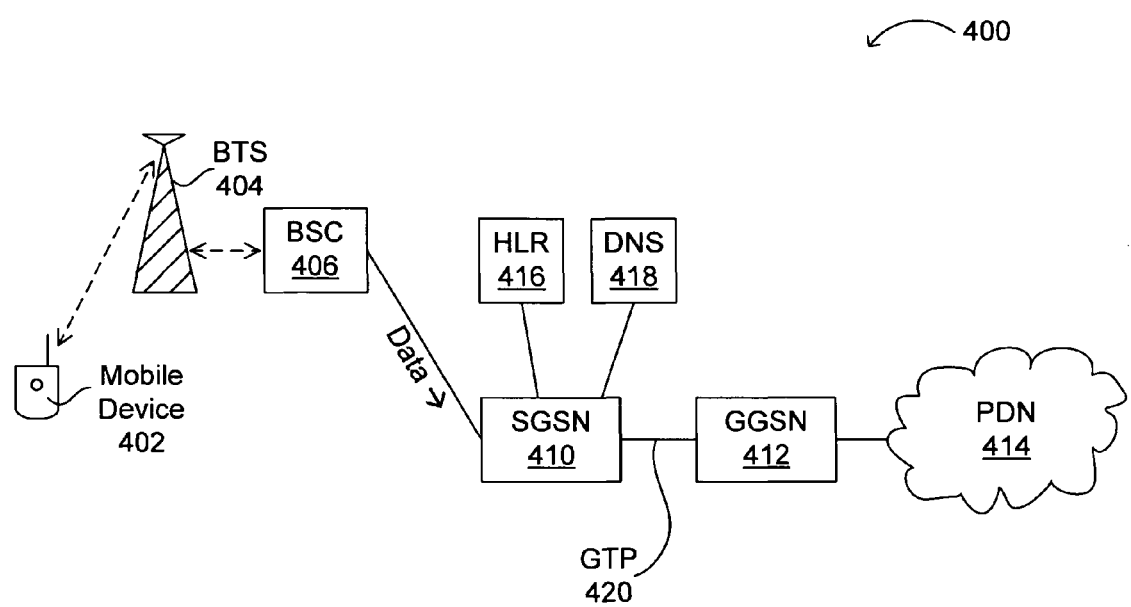
FIG. 4 illustrates an example General Packet Radio Services (GPRS) network.

Referring now to FIG. 4, an example GPRS network is shown and indicated by the general reference character 400. Such a network can employ Universal Mobile Telecommunications System (UMTS) 2.5 GHz and/or 3 GHz standards, for example. Mobile device 402 calls can be received/transmitted by BTS 404, which can interface with BSC 406. As discussed above, an RNC could also be utilized in place of the BSC. In the particular example of FIG. 4, if a call from mobile device 402 is a data call, it can be routed to SGSN 410. GGSN 412 can be a server and/or part of a switch/router, for example. As discussed above, mobile device 402 can be any device (e.g., a laptop, a cell phone, or another type of phone) that can access the Internet or Public Data Network (PDN) 414.

IP services that can be supplied to a mobile user of mobile device 402 can include services available via GGSN 412, such as QoS, IP address allocation, security, policy, and billing/charging. Further, SGSN 410 can provide wireless service control for a user (e.g., a user of mobile device 402). Such service control can include a user profile via Home Location Registry (HLR) 416 and/or Domain Name Service (DNS) 418. Once a user connection is established, the user information can be retrieved from a database stored on HLR 416. For example, a determination of the types of service that a particular user is authorized to utilize can occur in this fashion. Further, other parameters can also be supplied, such as QoS profile, access mode, and/or Access Point Name (APN), where an APN is essentially a logical name referring to a GGSN and an external network.

Mobile device 402 can have a user initially identified by IMSI (International Mobile Subscriber Identifier). With such information, SGSN 410 can retrieve the appropriate subscriber information for this user (e.g., an APN that the user is attempting to access from PDN 414). Such an APN may be provided via one server coupled to an actual web site that the user wishes to access. To facilitate this accessing, SGSN 410 can determine which of several possible GGSNs (e.g., GGSN 412) should be utilized for the connection. Each such GGSN may be able to support a subset of all APNs or other local settings and/or configurations of the APNs allocated to a particular GGSN, for example. As discussed above with reference to FIG. 2, a GGSN can be a layer 3 point of attachment, and an SGSN can be a layer 2 handoff function, for example.

In FIG. 4, GPRS Tunneling Protocol (GTP) 420 can be used to set up a user connection between SGSN 410 and GGSN 412. Among the parameters in GTP 420 are Mobile Service IP (MSIP) address, QoS, access mode, and billing/charging characteristics, to name just a few. In one embodiment, this parameter information can be stored in GGSN 412. In operation, when SGSN 410 receives an activation or access request (e.g., initiated via mobile device 402), SGSN 410 can pass such associated GTP 420 to GGSN 412. In particular embodiments, information can be made available to both SGSN 410 and GGSN 412 substantially in parallel. In any event, the parameter information can be stored in GGSN 412 as part of a Packet Data Protocol (PDP), which can be a GTP session or context for each user. Of course, other types of networks (e.g., CDMA, WiMAX, etc.) can also be utilized in particular embodiments.

Figure 5:
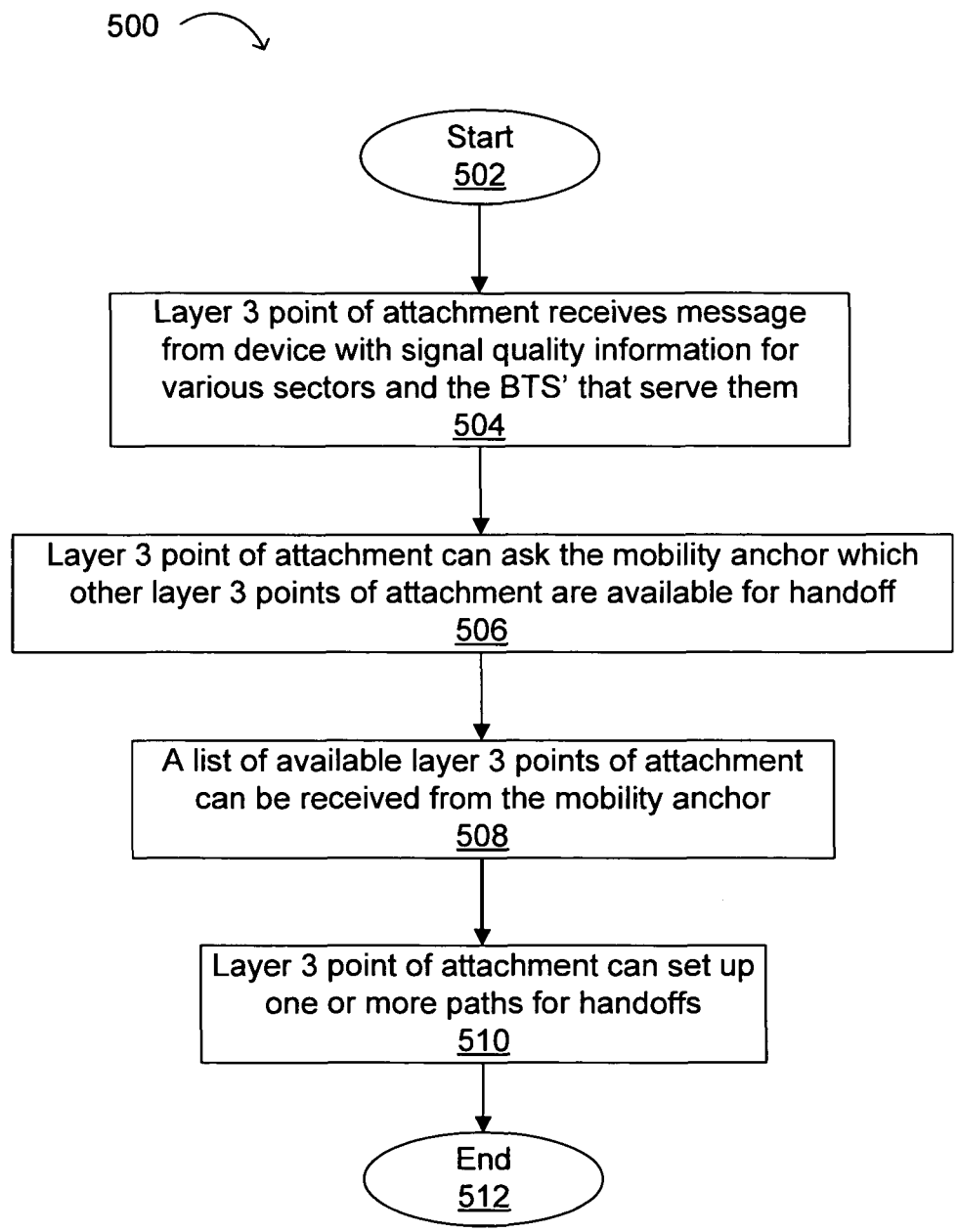
FIG. 5 illustrates an example method of assisting layer 3 handoff.

Referring now to FIG. 5, an example method of assisting layer 3 handoff is shown and indicated by the general reference character 500. The flow can begin (502), and a layer 3 point of attachment can receive a message from a mobile device with signal quality information for various sectors and the BTS' that serve them (504). Of course, any handoff indicative information, or other suitable information can be contained within, or associated with such a message.

The layer 3 point of attachment can then ask a mobility anchor which other layer 3 points of attachment are available for handoff (506). Next, a list of suitable layer 3 points of attachment can be received from the mobility anchor (508). One or more paths to facilitate a handoff to a new layer 3 point of attachment in the list can be arranged (510), and the flow can complete (512). The one or more path may be any path indicated as having a highest priority, for example. In particular embodiments, whatever service flows may be coming in to a point of attachment from a network via a mobility anchor can essentially be copied over to what may well be the next place the mobile device may arrive, as layer 3 may be concerned. This information can be copied at the layer 3 point of attachment level, for example. Alternatively, the mobility anchor can choose to set up more than one path to each of the layer 3 points of attachment.

A mobility anchor may be a point that is invariant as far as the external data network is concerned while a mobile device is moving around. Thus, to the rest of the world for a call duration, routing can be done to the mobility anchor, even though a cell phone is moving between cell sites. However, while handing off, there can be a group of layer 3 points of attachment. The mobility anchor can essentially be per subscriber, but there may potentially be a different mobility anchor for a new call, for example.

In particular embodiments, a mobile VoIP service can include a network configured to send a copy of each downstream packet to potential layer 3 points of attachment. For example, at the point a mobile device decides to receive layer 3 traffic from a new layer 3 point of attachment, there may be little or no delay incurred from a selection of this new layer 3 point of attachment. By such a network pre-establishing potential layer 3 points of attachment based on knowledge known to the mobile device, the mobile device can choose to send copies of the upstream data to a number of potential layer 2 points of attachment. The network can determine at layer 3 which of these upstream packets to route to the wider world based on knowledge in the mobile device of the conditions that originated the packets.

Also in particular embodiments, copies of a media stream can be sent to each potential layer 3 point of attachment. Further, such media stream copies can be available for sending to the mobile device when layer 2 indicates a path to that mobile device is available. In this fashion, perceived service quality can be enhanced for an end user.

Although the description has been described with respect to particular embodiments thereof, these particular embodiments are merely illustrative, and not restrictive. For example, as opposed to returning a result to a layer 3 point of attachment and providing choices, multiple paths from the mobility anchor can be provided to the different points of attachment. In another alternative, a layer 3 point of attachment may not necessarily talk to the mobility anchor, but rather can contain enough local knowledge to decide neighboring points of attachment that may handle certain cell sites, and can then make a local decision. Further, layer 3 points of attachment could also ask for a policy from a network, and provide appropriate directions, for example.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. An apparatus, comprising:
   one or more processors; and
   logic encoded in one or more tangible media for execution by the one or more processors, and when executed operable to:
      receive a message from a mobile device in a layer 3 point of attachment, the message having handoff indicative information to provide notice to the layer 3 point of attachment from the mobile device substantially in parallel and at substantially a same time with the handoff indicative information being received in a layer 2 handoff function block, wherein the handoff indicative information comprises a cell site identifier and a cell signal strength indicator;
      send a request for other available layer 3 points of attachment to a mobility anchor in response to the received message in the layer 3 point of attachment;
      receive a list of suitable layer 3 points of attachment from the mobility anchor in response to the request; and
      arrange one or more paths to facilitate a handoff of the mobile device to a new layer 3 point of attachment in the received list.

2. The apparatus of claim 1, wherein the handoff indicative information comprises global positioning system (GPS) information.

3. The apparatus of claim 1, wherein the cell site identifier is used to determine a likely layer 3 point of attachment to be the new layer 3 point of attachment.

4. The apparatus of claim 1, wherein the arrangement of one or more paths to facilitate the handoff comprises a pre-establishment of radio service.

5. The apparatus of claim 1, wherein the logic when executed is further operable to send copies of a media stream to each of the suitable layer 3 points of attachment in the received list prior to completion of the handoff of the mobile device.

6. The apparatus of claim 5, wherein a media stream copy from the new layer 3 point of attachment is sent to the mobile device after completion of the handoff.

7. A method, comprising:
   receiving a message from a mobile device in a layer 3 point of attachment, the message having handoff indicative information to provide notice to the layer 3 point of attachment from the mobile device substantially in parallel and at substantially a same time with the handoff indicative information being received in a layer 2 handoff function block, wherein the handoff indicative information comprises a cell site identifier and a cell signal strength indicator;
   sending a request for other available layer 3 points of attachment to a mobility anchor in response to the received message in the layer 3 point of attachment;
   receiving a list of suitable layer 3 points of attachment from the mobility anchor in response to the request; and
   arranging one or more paths to facilitate a handoff of the mobile device to a new layer 3 point of attachment in the received list.

8. The method of claim 7, wherein the handoff indicative information comprises global positioning system (GPS) information.

9. The method of claim 7, wherein the cell site identifier is used to determine a likely layer 3 point of attachment to be the new layer 3 point of attachment.

10. The method of claim 7, further comprising sending copies of a media stream to each of the suitable layer 3 points of attachment in the received list prior to completing the handoff of the mobile device.

11. The method of claim 10, wherein a media stream copy from the new layer 3 point of attachment is sent to the mobile device after completion of the handoff.

12. The method of claim 7, further comprising selecting the new layer 3 point of attachment from the received list based on a priority.

13. A non-transitory computer-readable storage medium having one or more instructions stored thereon, the one or more instructions being for execution by a processor, the storage medium comprising:
   one or more instructions for receiving a message from a mobile device in a layer 3 point of attachment, the message having handoff indicative information to provide notice to the layer 3 point of attachment from the mobile device substantially in parallel and at substantially a same time with the handoff indicative information being received in a layer 2 handoff function block, wherein the handoff indicative information comprises a cell site identifier and a cell signal strength indicator;
   one or more instructions for sending a request for other available layer 3 points of attachment to a mobility anchor in response to the received message in the layer 3 point of attachment;
   one or more instructions for receiving a list of suitable layer 3 points of attachment from the mobility anchor in response to the request; and
   one or more instructions for arranging one or more paths to facilitate a handoff to a new layer 3 point of attachment in the received list.

14. The storage medium of claim 13, wherein the handoff indicative information comprises global positioning system (GPS) information.

15. The storage medium of claim 13, wherein the cell site identifier is used to determine a likely layer 3 point of attachment to be the new layer 3 point of attachment.

16. A system, comprising:
- a layer 3 point of attachment having:
  - one or more processors; and
  - logic encoded in one or more tangible media for execution by the one or more processors, and when executed operable to:
    - receive handoff indicative information from a mobile device, the layer 3 point of attachment being configured to perform a handoff facilitating action in response to the handoff indicative information, wherein the handoff indicative information comprises a cell site identifier and a cell signal strength indicator;
    - send a request for other available layer 3 points of attachment to a mobility anchor in response to the received handoff indicative information in the layer 3 point of attachment;
    - receive a list of suitable layer 3 points of attachment from the mobility anchor in response to the request; and
    - arrange one or more paths to facilitate a handoff of the mobile device to a new layer 3 point of attachment in the received list; and
- a layer 2 handoff function block coupled to the layer 3 point of attachment,
- wherein the layer 2 handoff function block and the layer 3 point of attachment are configured to receive the handoff indicative information substantially in parallel and at substantially a same time.

17. The system of claim 16, wherein the handoff indicative information comprises global positioning system (GPS) information.

18. The system of claim 16, wherein the cell site identifier is used to determine a likely layer 3 point of attachment to be the new layer 3 point of attachment.

19. The system of claim 16, wherein the handoff facilitating action comprises a pre-establishment of radio service.

20. An apparatus for layer 3 handoff assistance, the apparatus comprising:
- means for receiving a message from a mobile device in a layer 3 point of attachment, the message having handoff indicative information to provide notice to the layer 3 point of attachment from the mobile device substantially in parallel and at substantially a same time with the handoff indicative information being received in a layer 2 handoff function block, wherein the handoff indicative information comprises a cell site identifier and a cell signal strength indicator;
- means for sending a request for other available layer 3 points of attachment to a mobility anchor in response to the received message in the layer 3 point of attachment;
- means for receiving a list of suitable layer 3 points of attachment from the mobility anchor in response to the request; and
- means for arranging one or more paths to facilitate a handoff of the mobile device to a new layer 3 point of attachment in the received list.

* * * * *